Oct. 10, 1944.  C. E. TACK  2,359,805

DUPLEX BRAKE

Filed Jan. 14, 1943  2 Sheets-Sheet 1

Inventor
Carl E. Tack

Oct. 10, 1944.   C. E. TACK   2,359,805
DUPLEX BRAKE
Filed Jan. 14, 1943   2 Sheets-Sheet 2
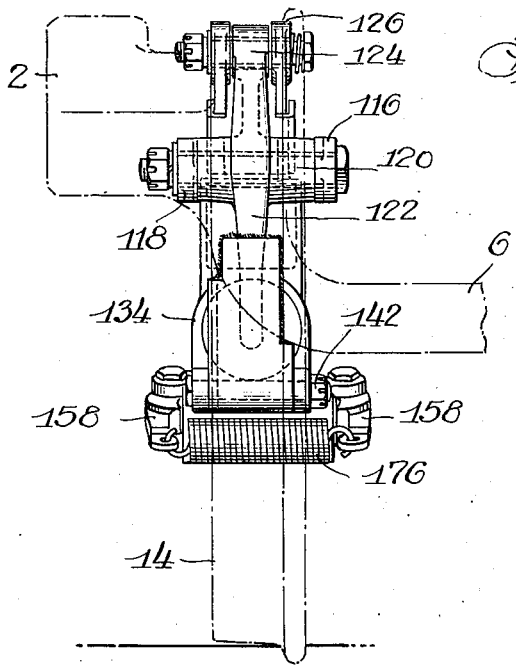
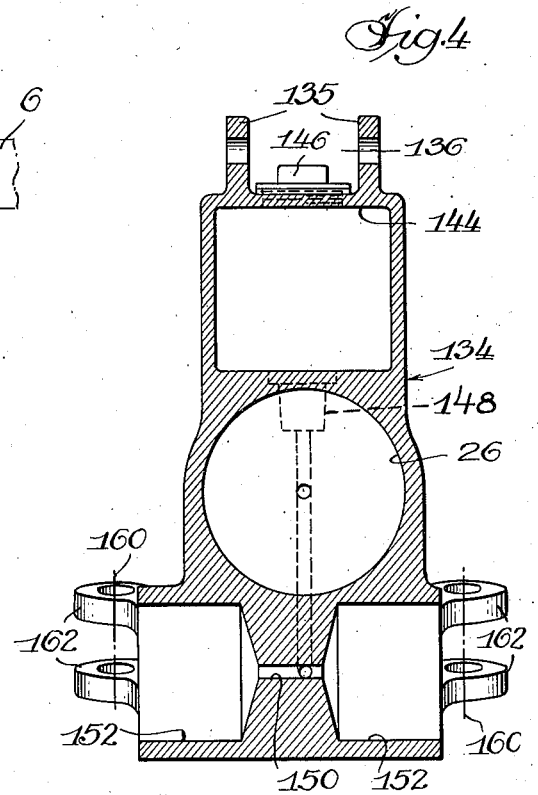
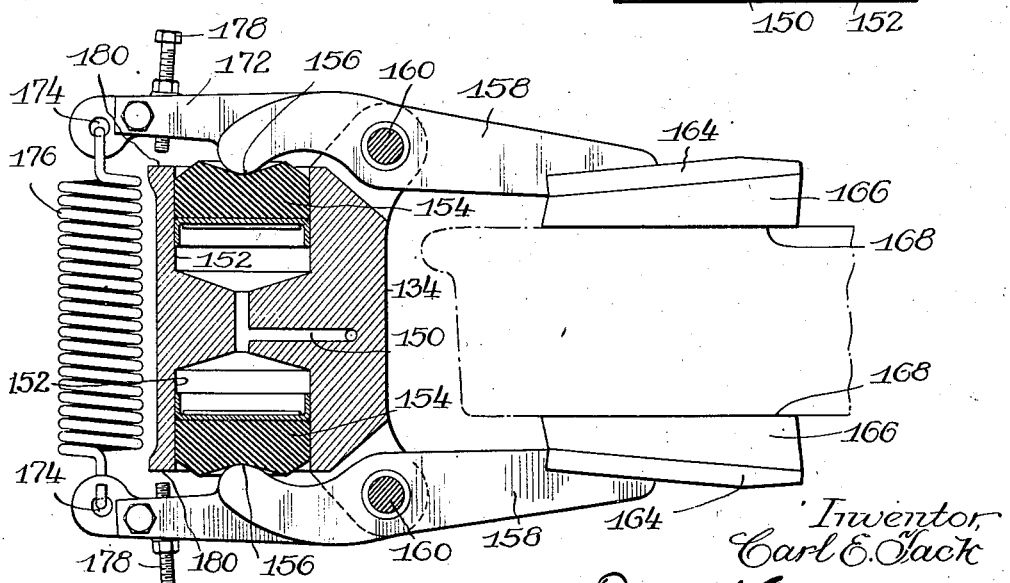
Inventor
Carl E. Tack Patented Oct. 10, 1944

2,359,805

UNITED STATES PATENT OFFICE 2,359,805

DUPLEX BRAKE

Carl E. Tack, Chicago, Ill., assignor to American Steel Foundries, Chicago, Ill., a corporation of New Jersey Application January 14, 1943, Serial No. 472,357

27 Claims. (Cl. 188—153)

My invention relates to braking means for a railway car truck and particularly to a combination of wheel tread braking means and disc braking means utilizing a principle set forth in my United States Patent No. 2,295,244, issued September 8, 1942, wherein power means in the form of an air cylinder actuates the brake mechanism, and hydraulic means is used for application of braking means by certain of the forces developed.

My invention comprehends an arrangement whereby a single shoe brake is afforded for the tread surface of each wheel and clasp brake means is associated with the opposite side of each wheel, so arranged as to brake inboard and outboard surfaces afforded on the wheel. This arrangement may be described as a single shoe brake at one side of each wheel and clasp brake means at the opposite side of each wheel.

A specific object of my invention is to so design the braking means that a single power means may be utilized for actuation of all of the braking elements, and in the modification illustrated certain of the power developed may be transmitted in part through levers and pull rods and in part through hydraulic means consisting of certain cylinders, described as master cylinders and auxiliary cylinders with tubular connections therebetween.

My invention contemplates an arrangement wherein independent braking means may be afforded at the respective sides of a railway car truck, each of the braking means including an air cylinder mounted at the side of the truck for actuation of interconnected live and dead cylinder levers, interconnected live and dead truck levers at opposite sides of each wheel, an operative connection between the cylinder levers and certain of the truck levers, and operative connections between other of the truck levers and hydraulic means for actuation of certain of the braking elements.

In the drawings,

Figure 3 is an end elevation of the truck and brake arrangement shown in Figures 1 and 2.

Figure 4 is a vertical sectional view through a portion of the brake structure at one end of the truck illustrating the arrangement of the hydraulic cylinders, the section being taken substantially in the vertical transverse planes indicated by the line 4—4 of Figure 2.

Figure 5 is a sectional view in the transverse diagonal plane indicated by the line 5—5 of Figure 2, the section being taken through the clasp brake mechanism at one end of the truck.

Figure 1:
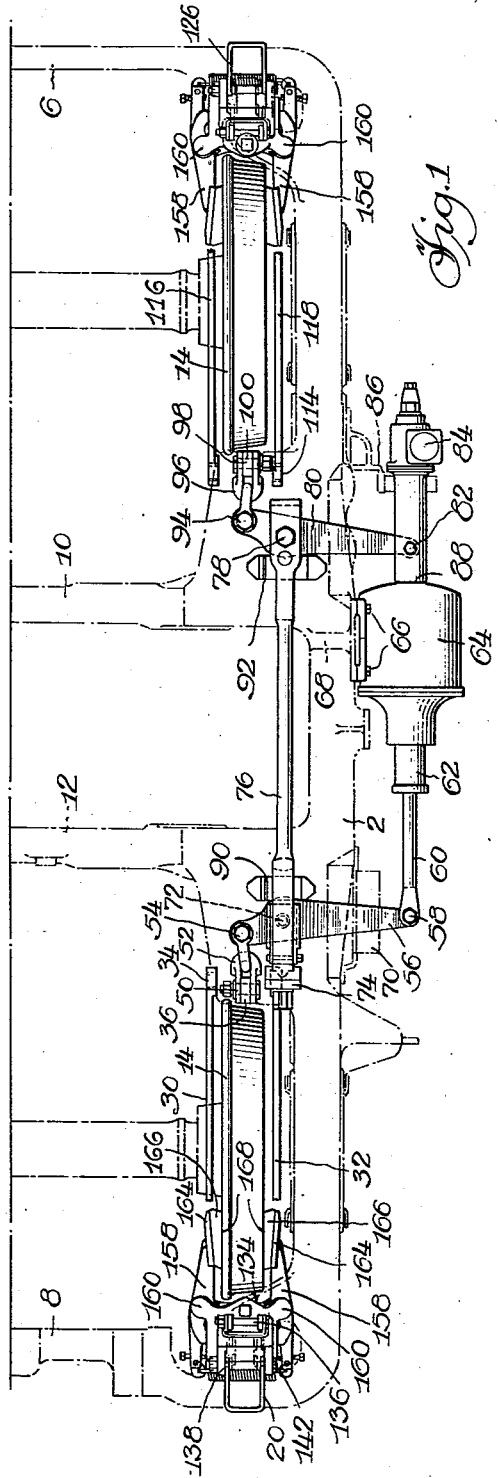
Figure 1 is a top plan view of one side of a car truck and brake arrangement embodying my invention, only one-half of the structure being shown inasmuch as the arrangement is similar at opposite sides thereof.

In each of the views certain details may be omitted where more clearly shown in other figures.

My novel arrangement as illustrated comprises a truck frame having the side rail 2 with pedestal openings 4, 4 of usual form at opposite ends thereof, integrally formed end rails 6 and 8, and spaced transoms 10 and 12 between which may be supported in usual manner a bolster upon which one end of a car body may be seated. Wheel and axle assemblies 14, 14 at opposite ends of the truck may be connected to the pedestal openings 4, 4 through journal boxes (not shown), and an equalizing arrangement (not shown) may be afforded in conventional manner for supporting the side rail 2 on the journal ends of the wheel and axle assemblies.

In the form illustrated, my novel brake rigging may comprise the dead truck lever 16 (Figure 2, left) fulcrumed at its upper end as at 18 from the bracket 20 afforded on the end rail 8 adjacent its juncture with the side rail 2. The lower end of the dead truck lever 16 is afforded a ball and socket connection as at 22 with the piston 24 of the main hydraulic cylinder 26 for operation of the adjacent clasp brake mechanism hereinafter more particularly described. Intermediate the ends of the dead truck lever 16 may be pivotally connected as at 28 the inboard and outboard paired over-axle straps 30 and 32 and the opposite ends of said straps may have pivotal connection as at 34 to the live truck lever 36 at the lower end of which may be pivotally supported as at 38 the brake head 40 carrying the brake shoe 42, the position of said head being properly maintained with respect to the adjacent wheel by means of the balancing mechanism 44 of well known form. Also connected at the pivotal point 38 may be the lower end of the hanger lever 46, the upper end thereof being hung as at 48 from the truck frame adjacent the juncture of the side rail 2 with the transom 12.

The upper end of the live truck lever 36 may have pivotal connection as at 50 with the clevis means 52, the opposite end of which may have pivotal connection as at 54 with the live cylinder lever 56 whose outboard end may have pivotal connection as at 58 to the rod 60 of the piston 62 forming a portion of the power means or air cylinder 64 which may be mounted as at 66, 66 on the bracket 68 integrally formed on the side rail 2. Slidable support for the live cylinder lever 56 may be afforded by the guide bracket 70 mounted on the side rail 2.

Intermediate its ends the live truck lever 56 may have pivotal connection as at 72 to the slack adjuster end portion 74 of the pull rod 76, the opposite end thereof having pivotal and adjustable connection as at 78 to the dead cylinder lever 80 whose outboard end may have pivotal and adjustable connection as at 82 to the slack adjuster 84 which may be supported from the side rail as at 86 and secured at one end to the cylinder 64 as at 88. The pull rod 76 may be slidably supported by guide brackets 90 and 92 mounted on the frame adjacent opposite ends of said pull rod.

The inboard end of the dead cylinder lever 80 may have pivotal connection as at 94 with the clevis means 96, and the opposite end of said clevis means may have pivotal connection as at 98 to the upper end of the live truck lever 100, the lower end thereof affording pivotal support as at 102 for the brake head 104 carrying the brake shoe 106, the position of said brake head 104 being controlled by the balance means 108. At the pivotal point 102 may also be connected the hanger 110 hung at its upper end as at 112 from the truck frame.

At an intermediate point of the live truck lever 100 may be pivotally connected as at 114 paired over-axle inboard and outboard straps 116 and 118, the opposite ends of said straps having pivotal connection as at 120 (Figure 3) at a point intermediate the ends of the dead truck lever 122, said dead truck lever being supported at its upper end as at 124 from the bracket 126 integrally formed with the truck frame adjacent the juncture of the side member 2 and the end rail 6. The lower end of the dead truck lever 122 may have a ball and socket connection as at 128 with the piston 130 of the main hydraulic cylinder 132 associated with the adjacent clasp brake mechanism.

Figure 2:
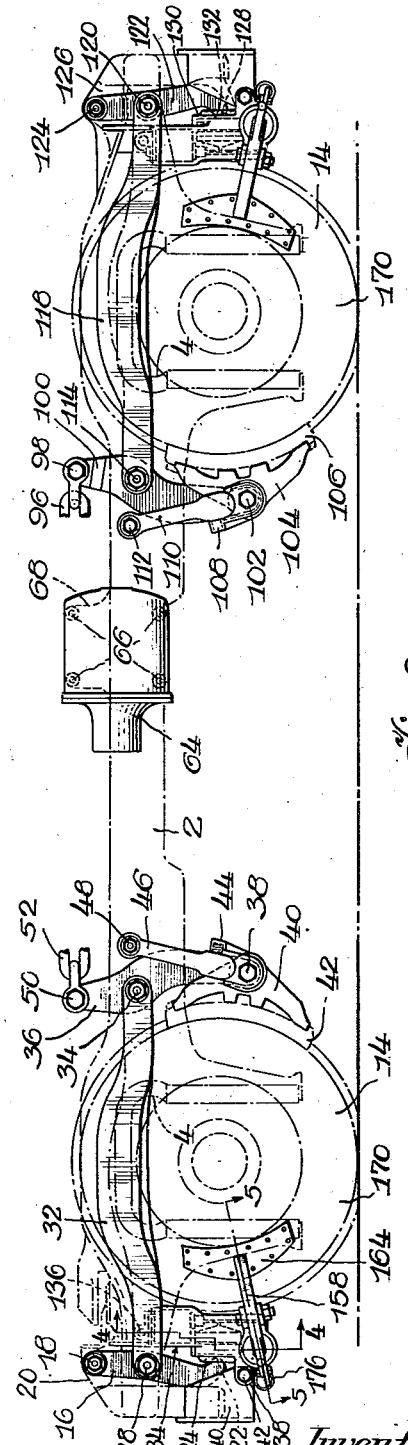
Figure 2 is a side elevation of the truck and brake arrangement shown in Figure 1.

Identical clasp brake mechanism is associated with each wheel and the detailed description may now be given of that associated with the wheel at the left of Figures 1 and 2, inasmuch as the sectional views of Figures 4 and 5 are taken therethrough. It will be seen that each clasp brake mechanism comprises a hydraulic casting generally designated 134 on the upper end of which may be formed ear lugs 135, 135 which may be supported as at 136 (Figure 2) from the truck frame. Adjacent the lower end of the casting 134 and at opposite sides thereof may be formed other ear lugs for connection as at 138, 138 to the frame bracket 140 by means of the bolt and nut assembly 142. At the upper end of the cylinder casting 134 may be formed the surplus liquid cavity 144 which may be filled through the removable screw cap 146 and which may drain through the one-direction valve 148 into the main hydraulic cylinder 26 therebelow. A tubular passageway 150 may be afforded from the main cylinder 26 to the identical auxiliary cylinders 152, 152 formed at opposite sides of the cylinder casting 134. In each auxiliary cylinder 152 may be mounted an auxiliary piston 154 and each auxiliary piston 154 may have ball and socket connection as at 156 to the adjacent dead lever 158. Each dead lever 158 may be fulcrumed intermediate its ends as at 160 from the bracket means 162 at the adjacent side of the cylinder casting, and each dead lever 158 may support at the wheel adjacent end a brake head 164 carrying the brake shoe 166 for engagement as at 168 with the disc braking surface 170 at the side of the adjacent wheel. Each lever 158 may have an end portion 172 projecting beyond the piston connection as at 156, and between the end portions 172, 172 may be mounted as at 174, 174 the release spring 176. Stop means 178 may be mounted on each end portion 172 for abutment as at 180 with stops provided on the cylinder casting to adjustably limit the movement of the levers 158, 158 in released position.

In operation, actuation of the power means or air cylinder 64 will actuate the live and dead cylinder levers 56 and 80 and through them the live and dead truck levers at opposite sides of each wheel in well known manner. It will be understood by those skilled in the art that the force applied to operate each of the dead truck levers 16 and 122 will be transmitted by said lever to the main piston of the associated hydraulic means and thence through the auxiliary pistons to the associated dead levers 158, 158 upon which are mounted the composition brake shoes for engagement with inboard and outboard faces of the adjacent wheel. Release of the power means will cause release of the various parts and positive release of the levers 158, 158 is assured by the release spring 176 connected therebetween.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, clasp brake means mounted at one side of the axle of an associated wheel, said clasp brake means comprising hydraulic power transmitting means including a cylinder casting, dead truck levers fulcrumed intermediate their ends at opposite sides of said casting and supporting brake shoes for engagement with inboard and outboard faces of said wheel, main and auxiliary cylinders with associated pistons in said casting, operative connections between said auxiliary pistons and said truck levers respectively, and means for actuating said main piston, said actuating means comprising a dead truck lever fulcrumed from the associated truck frame and having a ball and socket connection with said main piston.

2. In a brake arrangement for a railway car truck, a truck frame, spaced supporting wheel and axle assemblies, power means on said frame, and brake rigging comprising interconnected live and dead cylinder levers connected at opposite ends of said power means, single shoe and clasp brake means associated with each wheel, and operative connections between said cylinder levers and the adjacent wheel brake means, each of said clasp brake means comprising hydraulic actuating means including a main cylinder and auxiliary cylinders and ball and socket connections between the pistons associated with said auxiliary cylinders and adjacent truck levers.

3. In a brake arrangement, braking means for a single wheel comprising interconnected live and dead truck levers supported at opposite sides thereof, single shoe brake means associated with one of said levers, clasp brake means associated with the other of said levers, and actuating means for one of said levers, said clasp brake means comprising hydraulic power transmitting means in the form of a main hydraulic cylinder connected to a plurality of auxiliary hydraulic cylinders, and operative connections between the pistons of each of said cylinders and associated brake levers, certain of said associated brake levers supporting brake shoes for engagement with inboard and outboard faces of said wheel.

4. In a brake arrangement, a vehicle frame, a supporting wheel and axle assembly comprising an axle and a member rotatable therewith, brake means comprising dead brake levers at opposite sides of said member, and actuating means for said levers supported from said frame, said actuating means comprising a master hydraulic cylinder with a piston therein, a liquid reservoir connected to said master cylinder by a one-way valve permitting flow of liquid to said master cylinder, auxiliary cylinders having connection with said master cylinder, a piston in each auxiliary cylinder operatively associated with one of said levers, and means for actuating the first-mentioned piston.

5. In a brake arrangement for a railway car truck, a truck frame, spaced supporting wheel and axle assemblies, power means on said frame, and brake rigging comprising interconnected live and dead cylinder levers connected at opposite ends of said power means, single shoe and clasp brake means associated with each wheel, and operative connections between said cylinder levers and the adjacent wheel brake means, each of said clasp brake means comprising a pair of oppositely rotating dead brake levers supporting composition brake shoes for engagement with inboard and outboard faces of the adjacent wheel, and hydraulic actuating means therefor.

6. In a brake arrangement for a railway car truck, a truck frame, spaced supporting wheel and axle assemblies, power means on said frame, and brake rigging comprising interconnected live and dead cylinder levers connected at opposite ends of said power means, single shoe and clasp brake means associated with each wheel, and operative connections between said cylinder levers and the adjacent wheel brake means, each of said clasp brake means comprising hydraulic actuating means including a main cylinder and auxiliary cylinders and a ball and socket connection between the piston of said main cylinder and an adjacent brake lever.

7. In a brake arrangement for a railway car truck, a truck frame, spaced supporting wheel and axle assemblies, power means on said frame, and brake rigging comprising interconnected live and dead cylinder levers connected at opposite ends of said power means, single shoe and clasp brake means associated with each wheel, and operative connections between said cylinder levers and the adjacent wheel brake means, one of said brake means being mechanically operated and the other of said brake means being hydraulically operated.

8. In a brake arrangement, braking means for a single wheel comprising interconnected live and dead truck levers supported at opposite sides thereof, single shoe brake means associated with one of said levers, clasp brake means associated with the other of said levers, and actuating means for one of said levers, said clasp brake means comprising hydraulic power transmitting means in the form of a main hydraulic cylinder connected to a plurality of auxiliary hydraulic cylinders, and operative connections between the pistons of each of said cylinders and associated brake levers.

9. In a brake arrangement, clasp brake means mounted at one side of the axle of an associated wheel, said clasp brake means comprising hydraulic power transmitting means including a cylinder casting, dead truck levers fulcrumed at opposite sides of said casting and supporting brake shoes for engagement with inboard and outboard faces of said wheel, interconnected main and auxiliary cylinders in said casting, pistons in said auxiliary cylinders operatively connected to said truck levers respectively, and means for actuating a piston in said main cylinder.

10. In a brake arrangement, clasp brake means mounted at one side of the axle of an associated wheel, said clasp brake means comprising hydraulic power transmitting means including a cylinder casting, dead levers fulcrumed intermediate their ends at opposite sides of said casting and supporting brake shoes for engagement with inboard and outboard faces of said wheel, main and auxiliary cylinders with associated pistons in said casting, operative connections between said auxiliary pistons and said levers respectively, and means for actuating said main piston.

11. In a brake arrangement, a vehicle frame, spaced supporting wheel and axle assemblies each comprising an axle and a member rotatable therewith, friction means for engagement with inboard and outboard surfaces on each member, hydraulic actuating means for the friction means associated with each member, a power cylinder mounted on said frame, interconnected live and dead cylinder levers connected to opposite ends of said power cylinder, and an operative connection between each of said cylinder levers and the hydraulic means associated with one of said members.

12. In a brake arrangement, a vehicle frame, spaced supporting wheel and axle assemblies each comprising an axle and a member rotatable therewith, friction means for engagement with inboard and outboard surfaces on each member, hydraulic actuating means for said friction means, a dead truck lever operatively associated with said hydraulic means, a power cylinder mounted on said frame, interconnected live and dead cylinder levers connected to opposite ends of said power cylinder, and an operative connection between each of said cylinder levers and the adjacent dead truck lever.

13. In a brake arrangement, a vehicle frame, a supporting wheel and axle assembly comprising an axle and a member rotatable therewith, brake means comprising dead brake levers at opposite sides of said member, and actuating means for said levers supported from said frame, said actuating means comprising a master hydraulic cylinder with a piston therein, auxiliary hydraulic cylinders having a fluid connection to said master cylinder, a piston in each auxiliary cylinder operatively associated with one of said levers, and means for actuating the first-mentioned piston.

14. In a brake arrangement for a railway car truck, a truck frame, spaced supporting wheel and axle assemblies, power means on said frame, and brake rigging comprising interconnected live and dead cylinder levers connected at opposite ends of said power means, single shoe and clasp brake means associated with each wheel, and operative connections between said cylinder levers and the adjacent wheel brake means, each of said clasp brake means comprising hydraulic actuating means therefor.

15. In a brake arrangement, braking means for a single wheel comprising interconnected live and dead truck levers supported at opposite sides thereof, single shoe brake means associated with one of said levers, clasp brake means associated with the other of said levers, and actuating means for one of said levers, said clasp brake means comprising hydraulic power transmitting means in the form of a main hydraulic cylinder connected to a plurality of auxiliary hydraulic cylinders.

16. In a brake arrangement, clasp brake means mounted at one side of the axle of an associated wheel, said clasp brake means comprising hydraulic power transmitting means including a cylinder casting, dead levers fulcrumed at opposite sides of said casting and supporting brake shoes for engagement with inboard and outboard faces of said wheel, release means connected between said levers, said casting comprising main and auxiliary cylinders, and pistons in said auxiliary cylinders in abutment with said dead levers respectively.

17. In a brake arrangement, clasp brake means mounted at one side of the axle of an associated wheel, said clasp brake means comprising hydraulic power transmitting means including a cylinder casting, dead truck levers fulcrumed at opposite sides of said casting and supporting brake shoes for engagement with inboard and outboard faces of said wheel, interconnected main and auxiliary cylinders in said casting, and pistons in said auxiliary cylinders bearing against said levers respectively for actuation thereof.

18. In a brake arrangement, braking means for a single wheel comprising interconnected live and dead truck levers supported at opposite sides thereof, single shoe brake means associated with one of said levers, clasp brake means associated with the other of said levers, and actuating means for one of said levers, said clasp brake means comprising hydraulic power transmitting means.

19. In hydraulic power transmitting means for a brake arrangement, a cylinder casting comprising a main cylinder, a plurality of auxiliary cylinders, a connection between said cylinders, and a liquid reservoir superposed with respect to said main cylinder and connected thereto by a one-way valve, a piston in each of said cylinders, and a socket in each of said pistons for engagement with and actuation of an abutting brake lever.

20. In a brake arrangement, braking means for a single wheel comprising interconnected live and dead vertical levers supported at opposite sides thereof, single shoe brake means associated with one of said levers, clasp brake means comprising diagonal shoe supporting bars associated with the other of said levers, and actuating means for one of said levers, said clasp brake means comprising interconnected main and auxiliary cylinders, pistons in each of said cylinders, and sockets in said auxiliary pistons for abutment with and actuation of said bars.

21. In a brake arrangement, braking means for a single wheel comprising interconnected live and dead vertical levers supported at opposite sides thereof, single shoe brake means associated with one of said levers, clasp brake means comprising diagonal shoe supporting bars associated with the other of said levers, and actuating means for one of said levers, said clasp brake means comprising interconnected main and auxiliary cylinders, pistons in each of said cylinders, sockets in said auxiliary pistons for abutment with and actuation of said bars, and a socket in said main piston for abutment with said other lever.

22. In a brake arrangement, braking means for a single wheel comprising interconnected live and dead vertical levers supported at opposite sides thereof, single shoe brake means associated with said live vertical lever, clasp brake means associated with said dead vertical lever, and actuating means for said live lever, said clasp brake means comprising interconnected main and auxiliary cylinders with pistons, and diagonal shoe supporting levers having integral means abutting said auxiliary pistons respectively.

23. In a brake arrangement, braking means for a single wheel comprising interconnected live and dead vertical levers supported at opposite sides thereof, single shoe brake means associated with said live vertical lever, clasp brake means associated with said dead vertical lever, actuating means for said live lever, said clasp brake means comprising interconnected main and auxiliary cylinders with pistons, and diagonal shoe supporting levers having integral means abutting said auxiliary pistons respectively, and integral means on said dead lever abutting said main piston.

24. Brake mechanism comprising a vertical lever, a housing having a main and auxiliary cylinders with pistons, diagonal levers fulcrumed from said housing in abutment with said auxiliary pistons, and integral means on said vertical lever abutting said main piston.

25. Brake mechanism comprising a vertical lever, a housing having a main and auxiliary cylinders with pistons, diagonal levers fulcrumed from said housing in abutment with said auxiliary pistons, integral means on said vertical lever abutting said main piston, and means for actuating said vertical lever.

26. Brake mechanism comprising a vertical lever, a housing having main and auxiliary cylinders with pistons, said auxiliary cylinders having their axes approximately at right angles to the plane of said vertical lever, auxiliary levers fulcrumed from said housing with integral means abutting said auxiliary pistons, and integral means on said vertical lever abutting said main piston, and means for actuating said vertical lever.

27. Brake mechanism comprising an actuating lever, a housing having main and auxiliary cylinders with pistons, said auxiliary cylinders being arranged approximately at right angles to the plane defined by said actuating lever, auxiliary levers fulcrumed from said housing with integral means abutting said auxiliary pistons, and a connection between said main piston and said actuating lever.

CARL E. TACK.